(12) United States Patent
Reguzzi

(10) Patent No.: US 7,396,200 B2
(45) Date of Patent: Jul. 8, 2008

(54) MULTIPLE LOADER ADAPTED TO OPERATE AS A MAGAZINE FOR VERTICALLY ARRANGED PANELS

(75) Inventor: Luigi Reguzzi, Mariano Comense (IT)

(73) Assignee: R.E.M. S.r.l., Como (IT)

( * ) Notice: Subject to any disclaimer, the term of this patent is extended or adjusted under 35 U.S.C. 154(b) by 414 days.

(21) Appl. No.: 11/124,897

(22) Filed: May 9, 2005

(65) Prior Publication Data

US 2005/0265810 A1  Dec. 1, 2005

(30) Foreign Application Priority Data

May 26, 2004  (IT) ............................ MI2004A1067

(51) Int. Cl.
*B65G 1/14* (2006.01)
(52) U.S. Cl. ..................... 414/331.14; 414/331.02; 414/331.03; 414/331.04; 414/331.17
(58) Field of Classification Search ............ 414/331.02, 414/331.03, 331.04, 331.13, 331.17
See application file for complete search history.

(56) References Cited

U.S. PATENT DOCUMENTS

| | | | | |
|---|---|---|---|---|
| 5,253,743 A | * | 10/1993 | Haas et al. ............... | 198/347.1 |
| 5,360,306 A | * | 11/1994 | Nakayama et al. ..... | 414/331.08 |
| 5,362,197 A | * | 11/1994 | Rigling ...................... | 414/807 |
| 5,415,112 A | * | 5/1995 | Takahashi ................... | 110/246 |
| 5,473,978 A | * | 12/1995 | Colombo ................... | 99/443 C |
| 5,505,586 A | * | 4/1996 | Lichti ......................... | 414/800 |
| 7,073,657 B2 | * | 7/2006 | Langenegger et al. .... | 198/460.1 |
| 7,074,002 B2 | * | 7/2006 | Weeden et al. ............. | 414/278 |
| 2002/0172580 A1 | * | 11/2002 | Mueller et al. ......... | 414/331.14 |

FOREIGN PATENT DOCUMENTS

| | | | | |
|---|---|---|---|---|
| JP | 363277109 A | * | 11/1988 | ................ 414/564 |
| JP | 404201974 A | * | 7/1992 | ........... 414/331.03 |
| JP | 6024524 | * | 2/1994 | ........... 414/331.03 |
| WO | WO9221592 A1 | * | 12/1992 | ........... 414/331.03 |

* cited by examiner

*Primary Examiner*—Saul J. Rodriguez
*Assistant Examiner*—M. S Lowe
(74) *Attorney, Agent, or Firm*—James V. Costigan; Hedman & Costigan, P.C.

(57) ABSTRACT

A multiple loader, also adapted to operate as a magazine for storing vertically arranged panels, comprises, at a front head portion thereof, a step-by-step pushing device including a carriage driven by pneumatic cylinders causing the carriage to slide with a rectilinear reciprocating horizontal movement, to provide a pushing action on a first of a series of separating elements, arranged at a top sliding platform.

8 Claims, 8 Drawing Sheets

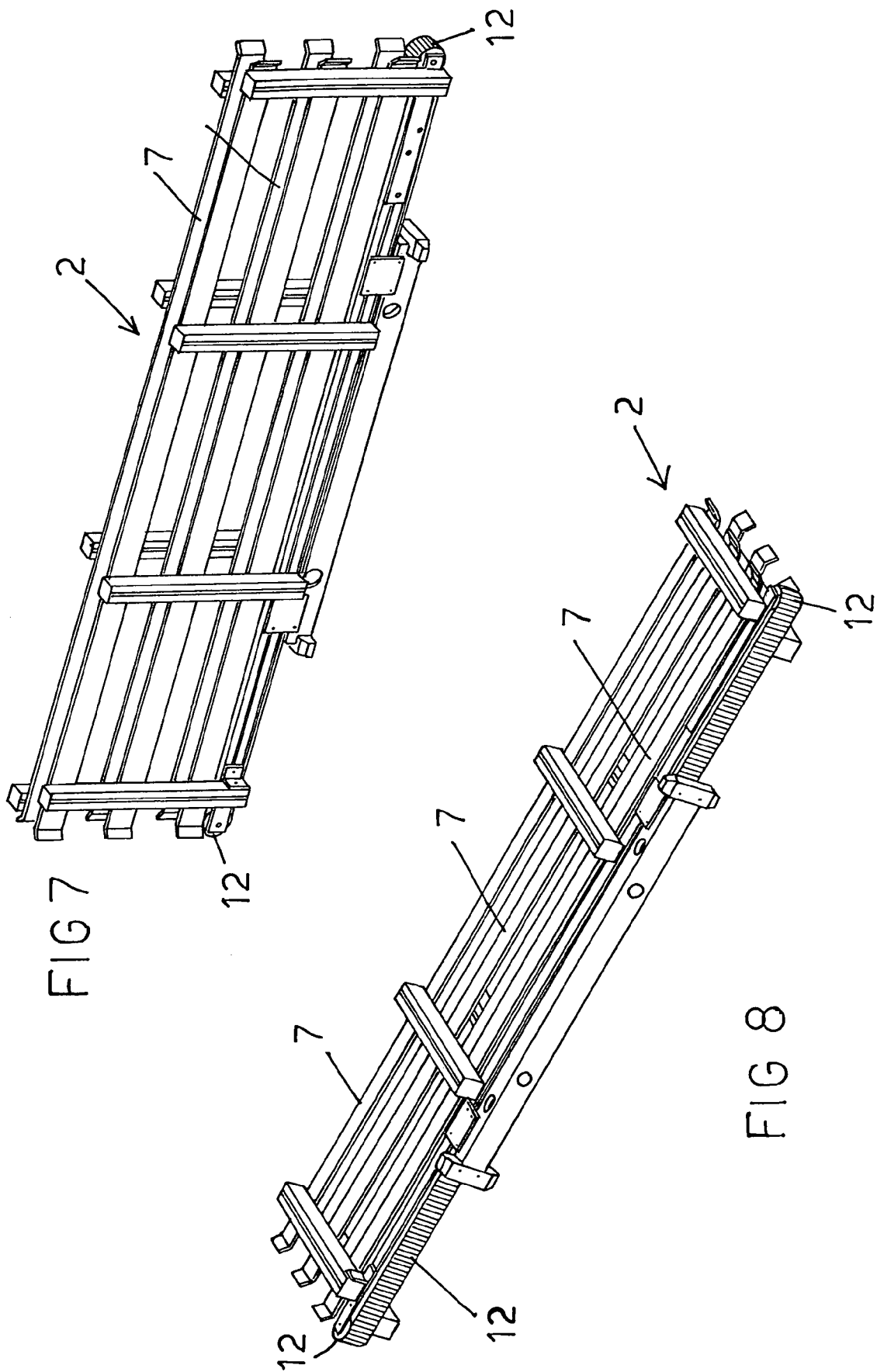

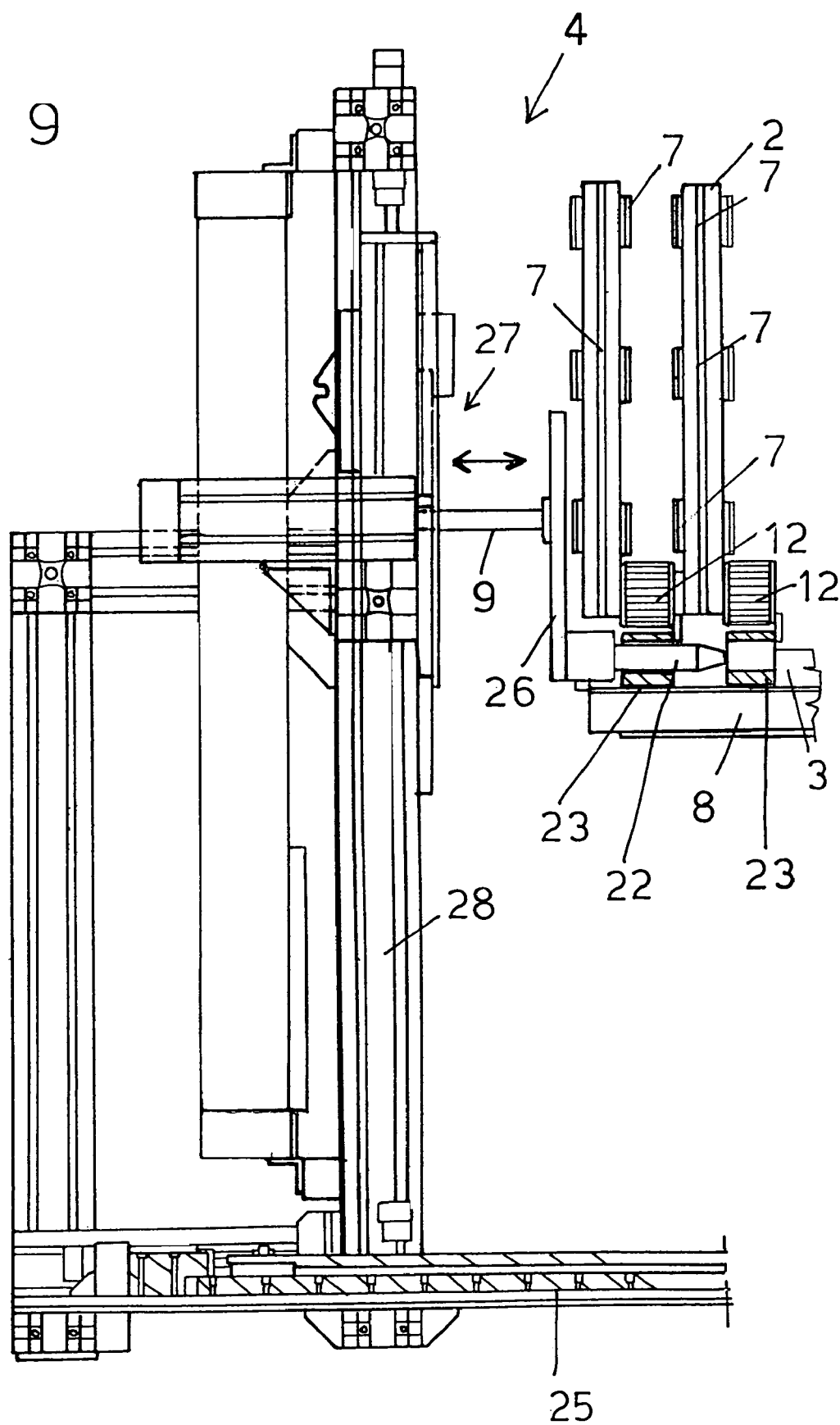

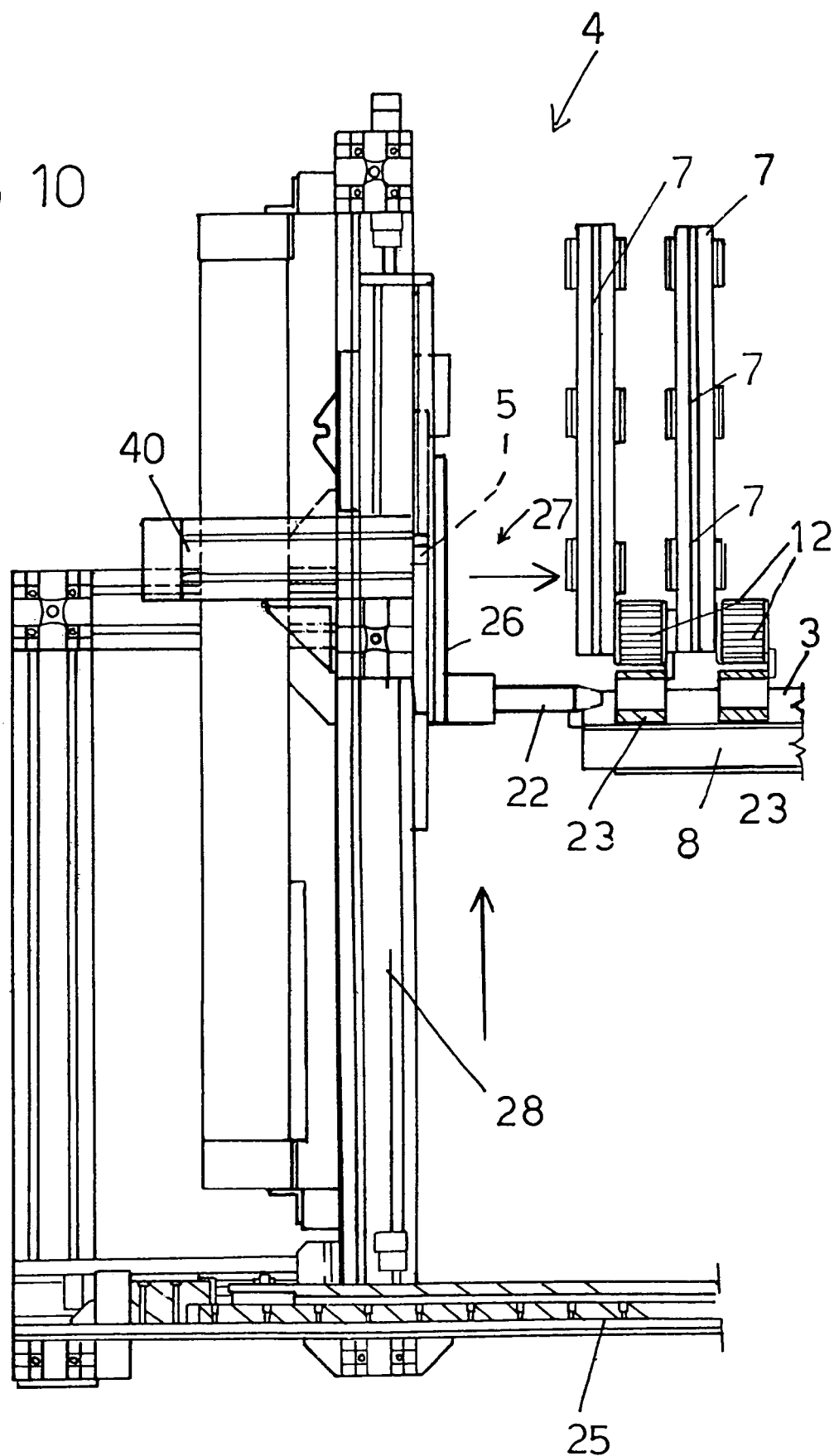

(1)

MULTIPLE LOADER ADAPTED TO OPERATE AS A MAGAZINE FOR VERTICALLY ARRANGED PANELS

BACKGROUND OF THE INVENTION

The present invention relates to a 24-position loader for vertically arranged panels, which is also adapted to operate as an accumulating magazine and plenum element to be applied to machines for processing panels for making furniture pieces.

Multiple loaders for the above mentioned applications are already known; however, they have the drawback of requiring the use of several separating elements, which are arranged, in a like number, on a top platform and on a bottom platform.

Accordingly, the number of the useful separating elements arranged on the top platform being the same, and between pair of which are arranged vertically stored panels, said loaders require to use a like number of separating elements, arranged on the bottom platform, and which, in such a step, are operatively inactive.

In fact, the latter separating elements, upon unloading each panel, which is stored on the top platform, are conveyed onto the bottom platform, thereon they are caused to be fed with a small feeding speed, without providing any useful functions, and being then reconveyed to the top platform.

SUMMARY OF THE INVENTION

Accordingly, the aim of the present invention is to overcome the above mentioned drawbacks, by providing a simplified multiple loader in which the number of used separating elements is practically reduced to a half, i.e. in which are exclusively provided the separating elements arranged on the top platform, and provided for housing and conveying the panels to be processed.

Within the scope of the above mentioned aim, a main object of the present invention is to provide such a multiple loader including a bottom platform on which a single separating element is provided.

Another object of the present invention is to provide such a multiple loader in which, as a panel is unloaded and conveyed to an operating machine, the separating element arranged at the end portion of the top platform is unloaded onto the bottom platform and then is immediately conveyed to the front end portion of the bottom platform and then quickly reconveyed again to the top platform.

Yet another object of the present invention is to provide such an improved multiple loader which, in addition to being very simple construction-wise, can also be made at a very reduced cost.

Yet another object of the present invention is to provide such a multiple loader which requires that comparatively low power operating motors be used, thereby providing great power savings.

According to one aspect of the present invention, the above mentioned aim and objects, as well as yet other objects, which will become more apparent hereinafter, are achieved by a multiple loader, also adapted to operate as a magazine for storing vertically arranged panels, characterized in that said multiple loader comprises, at a front head portion thereof, a step-by-step driven device, and a carriage, driven by pneumatic cylinders causing said carriage to slide with a horizontal rectilinear reciprocating movement, thereby providing a pushing action on a first of a series of separating elements arranged on a sliding top platform.

BRIEF DESCRIPTION OF THE DRAWINGS

The above mentioned and other features, of functional and constructional nature, of the multiple loader according to the present invention, will become more apparent from the following detailed disclosure of a preferred, though not exclusive, embodiment thereof, which is illustrated, by way of an indicative, but not limitative, example in the accompanying drawings, where:

FIGS. 7 and 8 are respective perspective views illustrating the separating elements applied to the multiple loader according to the present invention; and FIGS. 9 and 10 illustrate two operating positions of the front head portion of the subject multiple loader and, in particular, of a lifting device, provided at the front head portion of said multiple loader.

DESCRIPTION OF THE PREFERRED EMBODIMENTS

Figure 1:
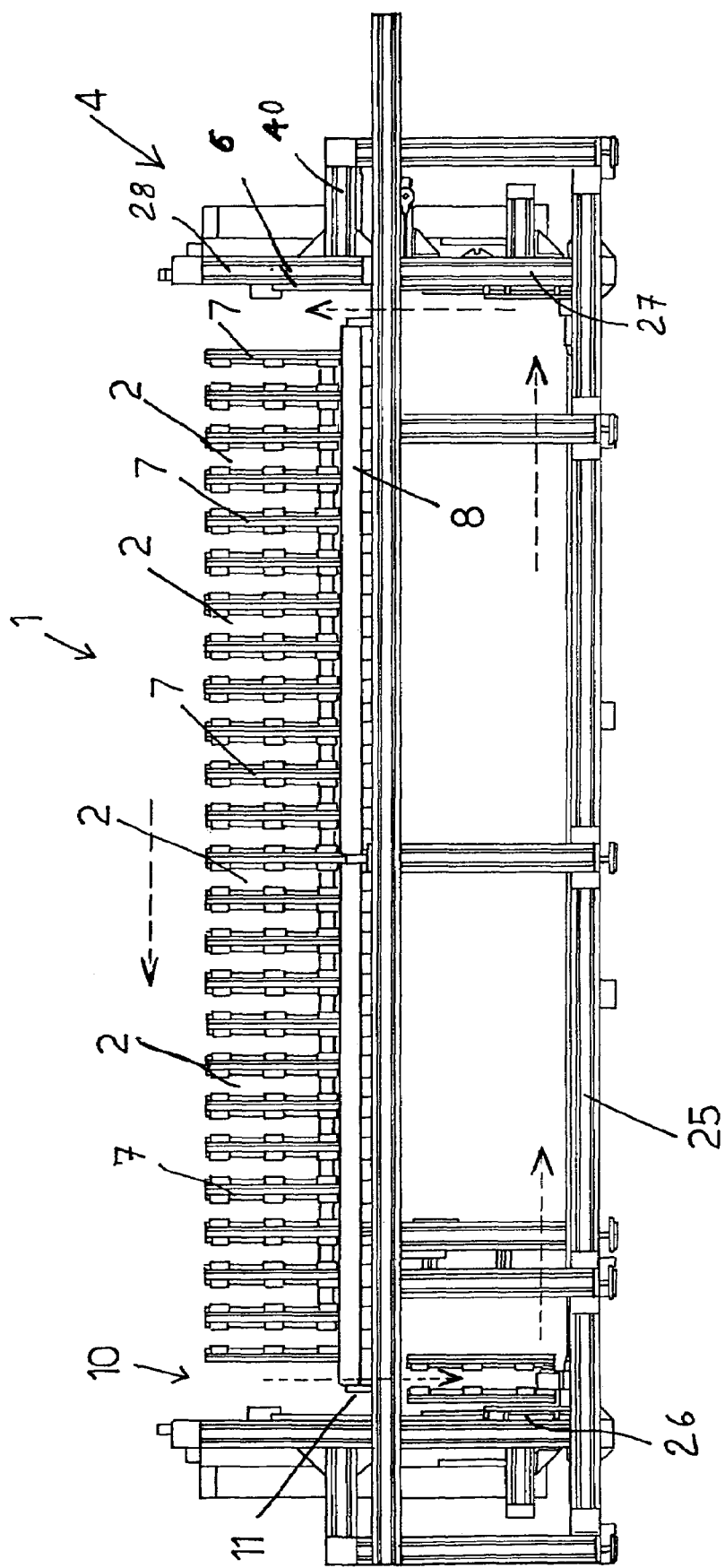
FIG. 1 is a side elevation view illustrating the multiple loader according to the present invention.
Figure 2:
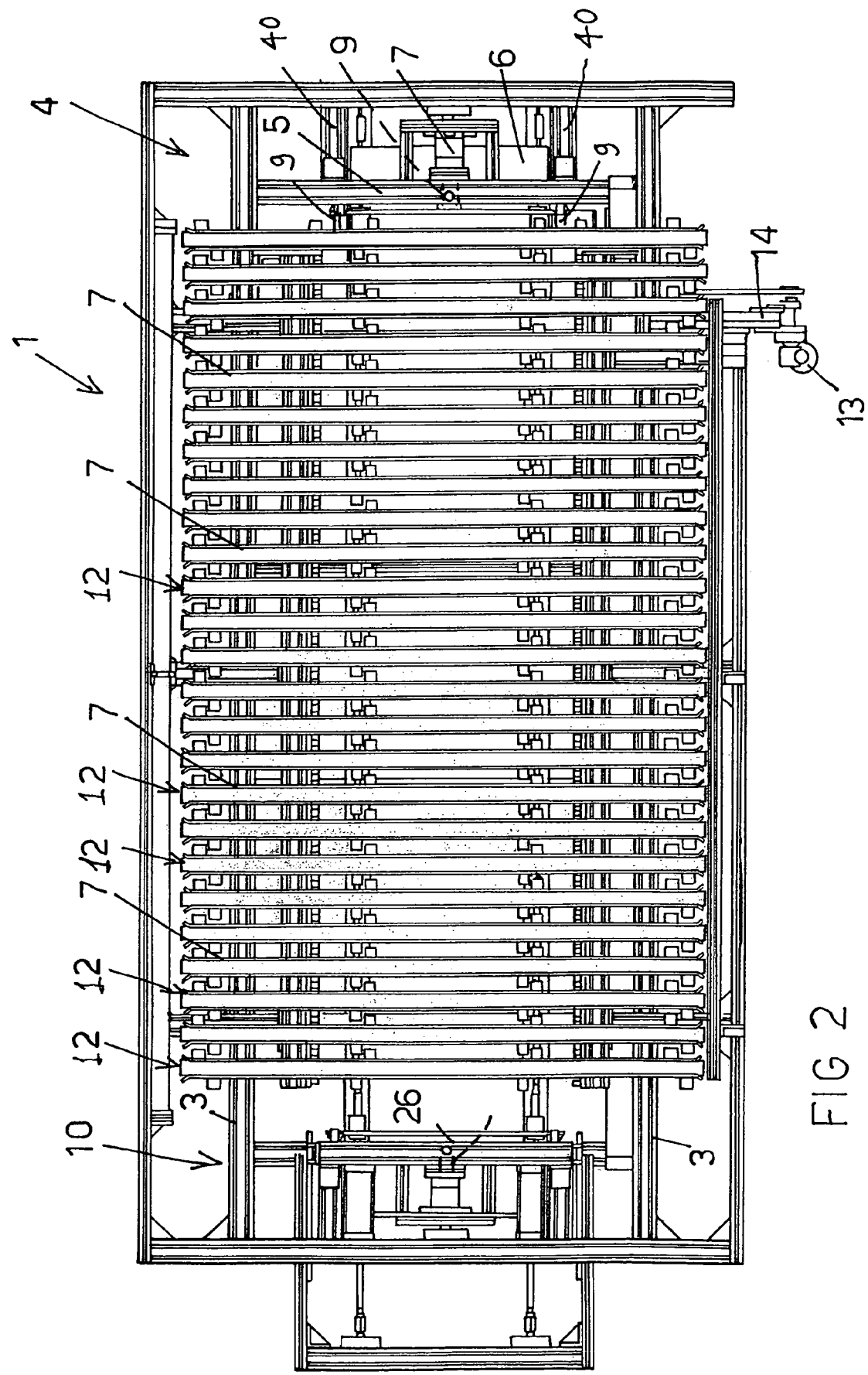
FIG. 2 is a top plan view illustrating the multiple loader according to the invention.
Figure 3:
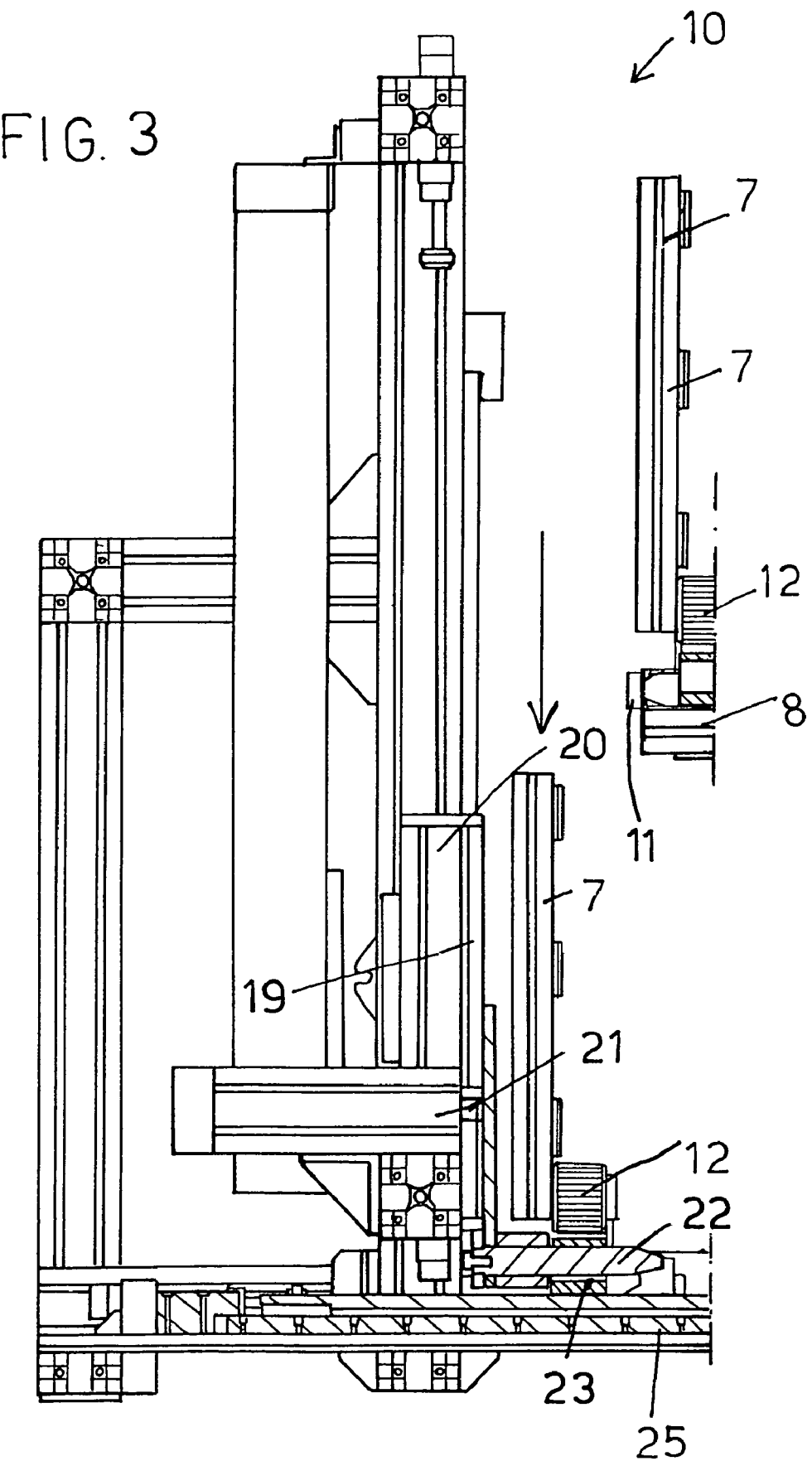
FIG. 3 is a partial side detail view illustrating a rear head and a device for taking, one at a time, the several separating elements from the top platform, to arrange them on the bottom platform.
Figure 4:
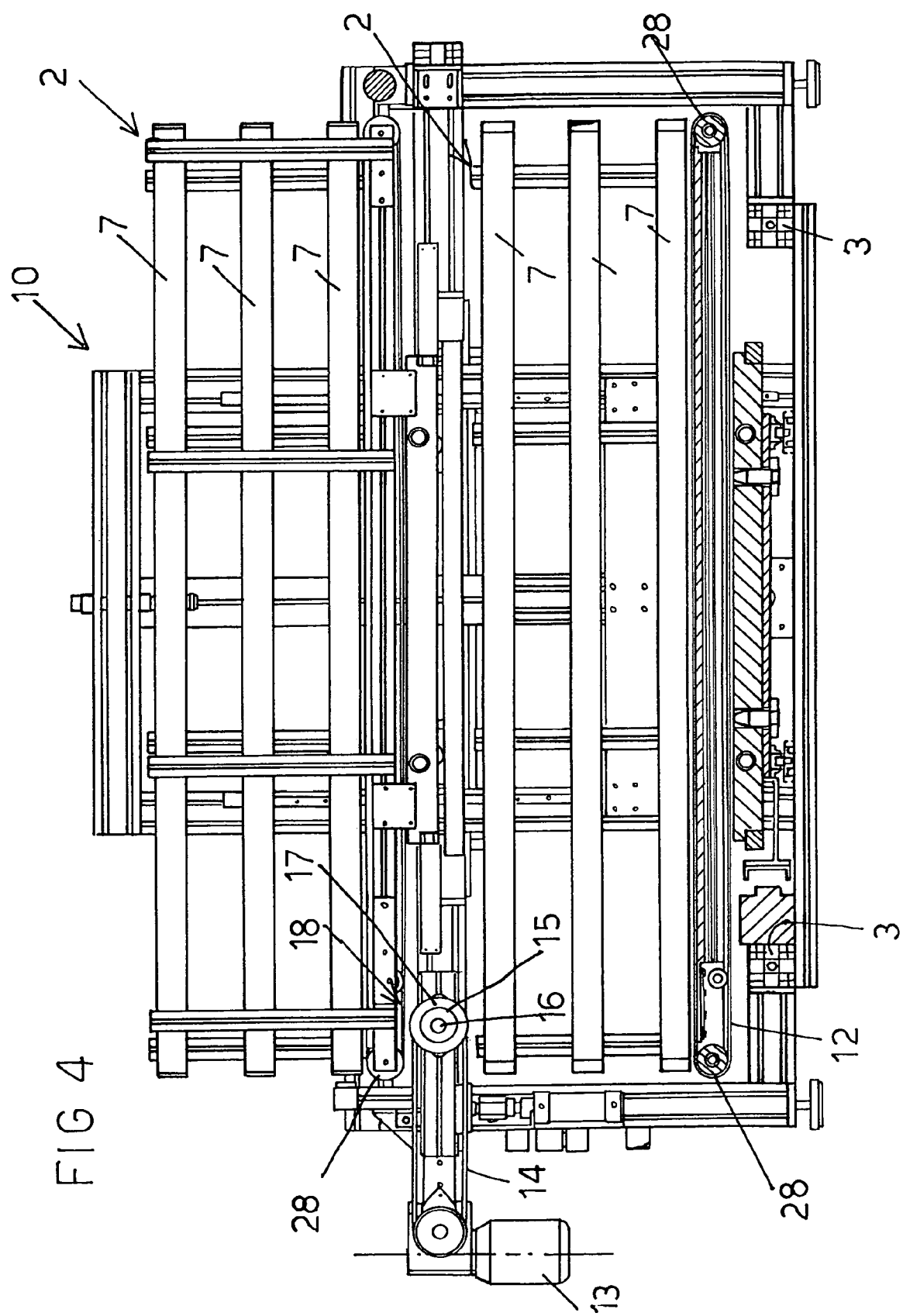
FIG. 4 is a front side view illustrating the multiple loader according to the present invention, the view being taken from a direction orthogonal to the view of FIG. 1.
Figure 5:
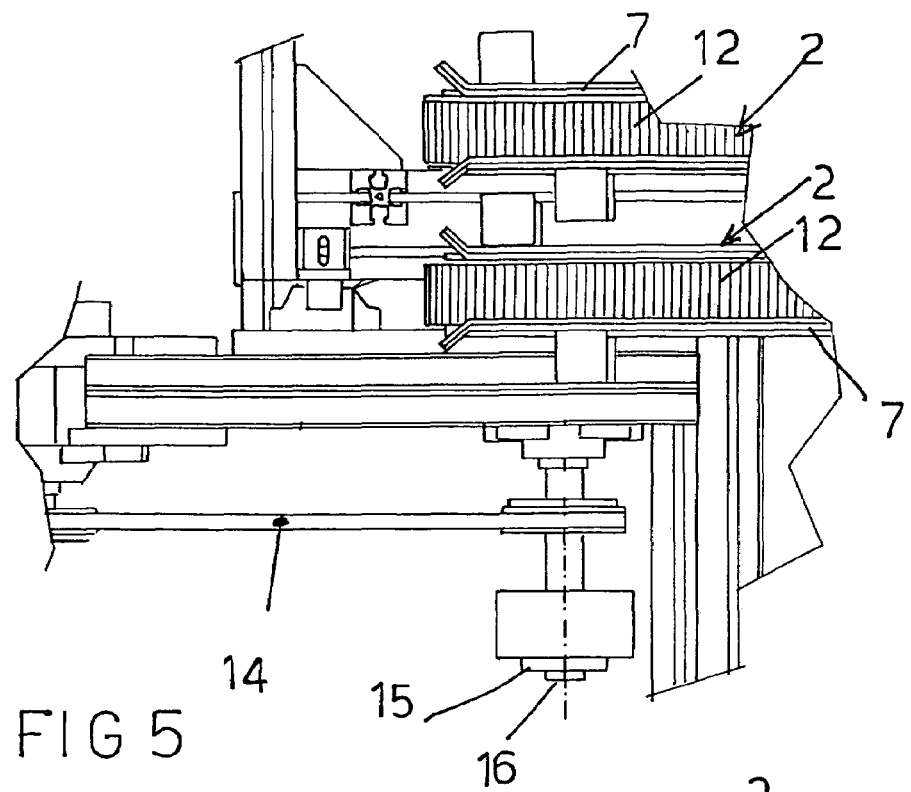
FIG. 5 is a detail view illustrating a detail of a driving assembly for driving a plurality of conveyor belts supporting the panels to be unloaded, which are vertically arranged.
Figure 6:
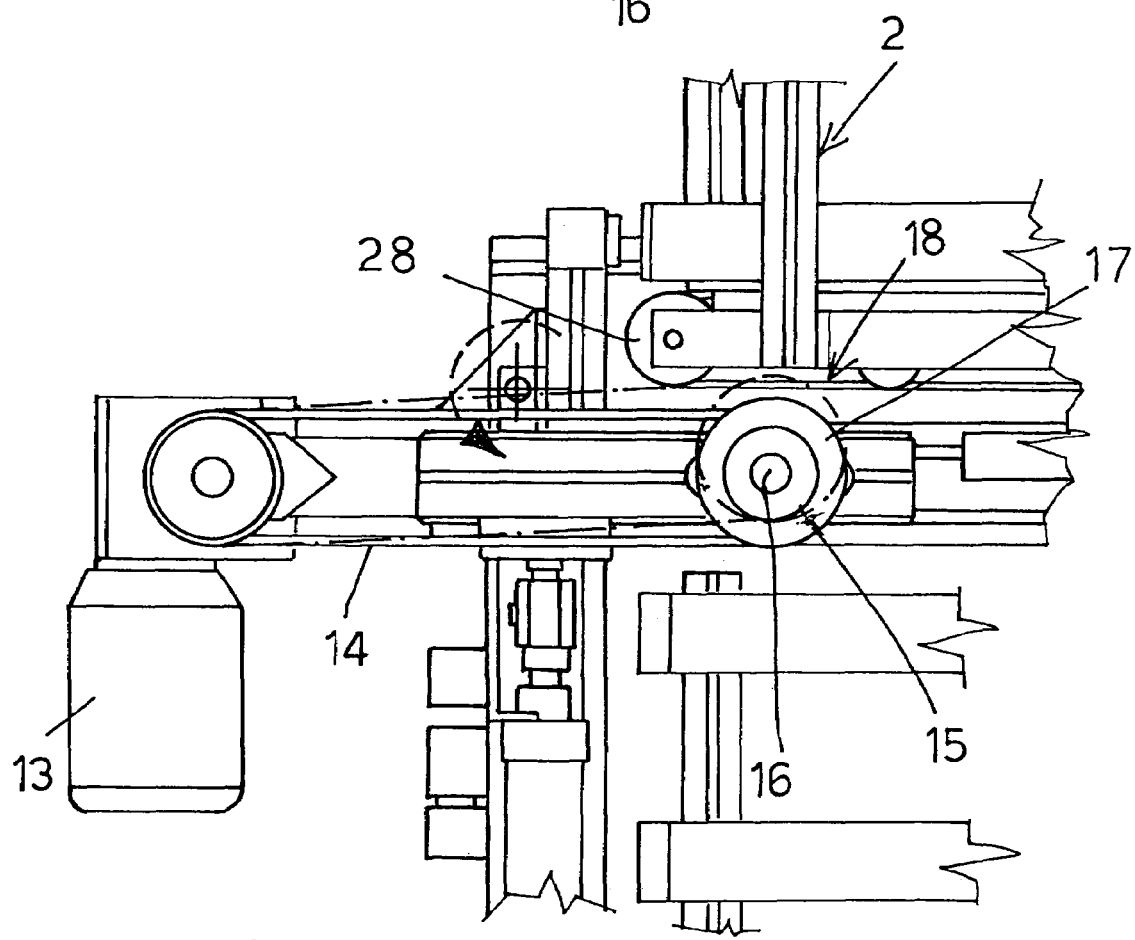
FIG. 6 is a side partial view illustrating the detail shown in FIG. 5.

With reference to the number references of the above mentioned drawings, the multiple loader 1 according to the present invention comprises, at a front head portion 4 thereof, .a stepbystep pushing device 5, driven by pneumatic pistons 40, and a front carriage or raising device 27, also driven by pneumatic cylinders 39 which, through a piston rod 9, causes said carriage 27 to slide with a horizontal rectilinear reciprocating movement, thereby providing a pushing force or action on the first of a series of separating elements 7, which are arranged on a sliding platform, the pushing force being provided by two rods which, as they are projected, causes the head separating element 7 to perform a step-by-step sliding movement, thereby driving the following separating elements 7, which will slide on respective pairs of C-shape guides 3.

The multiple loader 1 comprises moreover, at a rear end portion 10 thereof, a locking device 11, adapted to operate as a limit or locking element for the separating elements 7, as said device 11 is in an operating condition.

To each separating element 7 is associated a conveyor belt 12 which, as it is operated or driven, causes a panel, not shown and to be arranged in the space 2 defined by each pair of separating elements 7 to be laterally projected along its vertical laying plane.

More specifically, the withdrawal of the panel is driven by a gear unit 13 which, through a pulley 13 and a driving belt 14, drives a further pulley 15 keyed on a driving shaft 16.

The latter is caused to swing by a pneumatic piston 30.

On the shaft 16 is keyed a toothed pulley 17 which is caused to contact, by portions, a conveyor belt 12 thereon a panel is arranged.

Said conveyor belt 12, applied to a separating element, is accordingly caused to be driven, with an intermittent motion, as the toothed pulley 17 is caused to swing and contact said conveyor belt 12 applied to a separating element 7.

The swinging movement of the toothed pulley 17 and of the swinging supporting assembly 18 therefor, is driven or controlled by a pneumatic piston 20.

Thus, the above mentioned swinging supporting assembly 18, upon unloading a panel, will be lowered, thereby causing the pinion 17 to be disengaged from the conveyor belt 12, thereby the latter will be stopped.

In this connection it should be apparent that, after having unloaded the panel, at the unloading rear end portion 10, a vertically movable device 19 driven by two pneumatic pistons 20 is arranged.

Moreover, further pneumatic actuators 21 are provided, designed for performing a horizontal movement and supporting a carriage including horizontal pins 22.

Said horizontal pins are engaged in the bottom plate 23 on each separating element 7, which plate comprises a bottom conveyor belt 12.

Said vertically movable device 19, arranged at the rear end portion 10 of the subject multiple loader, can be lowered, after having engaged said horizontal pins 22 in said bottom plate or basement 23 of a separating element 7.

Moreover, said device 19 can be lowered under the effect of pneumatic pistons 20 which can be vertically reciprocatedly rectilinearly driven.

Thus, owing to the above disclosed combined movement, each separating element 7 will be taken, after having unloaded a panel, from the top sliding platform 8 and will be caused to downward translate up to arrive on the bottom platform 25.

As the separating element 7 arrives at said bottom platform, it will be frontward pushed by a rear pushing element or feeding carriage 26 to the front end portion of the head of the multiple loader 1.

The front carriage or raising device 27 further comprises a plurality of horizontal pins 22 engaging in housing recesses, also horizontally extending, formed in the bottom plate 23 of each separating element 7.

The front raising device 27 comprises, moreover, a pneumatic piston 28 designed for vertically raising a separating element 7 so as to cause the latter to be arranged again on the top platform 8.

More specifically, said separating element 7 is frontward driven on the top platform 8 under a reciprocating rectilinear movement of pushing devices 5 which, as the separating element 7 is raised, are arranged at a withdrawn position to be then advanced.

Said pushing devices 5 will provide a step-by-step pushing force on the separating element 7 which has been moved from the bottom sliding platform 25 up to the top sliding platform 8.

Then, the step-by-step feeding cycle of each separating element 7 will be continued, said separating element 7 being also provided, as stated, with toothed conveyor belts 12 entrained, at the end portions thereof, on entrainment pulleys 28 engaging with said toothed pulley 17.

Said toothed pulley 17 can be swingably driven, thereby engaging with and disengaging from the tooth arrangement provided on the outer surfaces of each conveyor belt 12; each said conveyor belt 12 including a twin tooth arrangement at each of the two sides thereof.

In this connection it should be pointed out that on the rear bottom pushing element or feeding carriage 26 are provided a plurality of vertically extending pins, including a top tapering portion, thereby aiding in centering and supporting at a set vertical position each panel, as said panel is driven on the bottom sliding platform 25 from the rear head portion 10 to the front head portion 4.

In this connection it should be moreover pointed out that the bottom feeding carriage 26, after having arrived at its limit front position, will perform again a return horizontal movement, to return again to its starting position, arranged at the rear head portion 10 of the inventive loader 1.

This horizontal driving movement of the bottom feeding carriage 26 is controlled by rodless pneumatic actuators 21.

While the loader device 1, designed for also operating as a magazine for vertically arranged panels has been hereinbefore disclosed by way of an exemplary embodiment, it should be apparent that it is susceptible to several modifications and variations all of which will come within the scope of the invention.

The invention claimed is:

1. A multiple panel loader for feeding vertically arranged panels, to a machine for processing panels for making furniture pieces, said loader comprising:
a sliding top platform, a plurality of adjoining separating element supported by said sliding top platform, each pair of adjoining separating elements defining a space to receive a respective vertically arranged panel therein, a reciprocating pushing device to provide an intermittent pushing force on the first of a series of said separating elements arranged on said sliding top platform, a bottom platform supporting a rear separating element pushing assembly for pushing said separating elements to a raising device for vertically raising said separating elements from said bottom platform to said sliding top platform, wherein each separating element is associated with a bottom conveyor belt for conveying a panel arranged between a respective pair of said separating elements.

2. A multiple loader, according to claim 1, wherein each said panel is driven by a geared unit which, through a pulley and a belt drives a further pulley keyed on a shaft.

3. A multiple loader, according to claim 2, wherein said shaft is swingably driven by a pneumatic piston.

4. A multiple loader, according to claim 2, wherein on said shaft is keyed to a toothed pulley which is caused to contact, by portions, said conveyor belt.

5. A multiple loader, according to claim 4, wherein said conveyor belt is intermittently driven as said toothed pulley is caused to contact said conveyor belt.

6. A multiple loader, according to claim 5, wherein said toothed pulley is supported by a swinging support, said toothed pulley and swinging support being driven by a pneumatic piston.

7. A multiple loader, according to claim 6, wherein said swinging support, upon unloading each said panel, is lowered thereby disengaging said toothed pulley from said conveyor belt, thereby causing said conveyor belt to be stopped.

8. A multiple loader, according to claim 1, wherein said loader further comprises two horizontal pneumatic actuators driving two horizontal pins engaging in a bottom plate of each separating element, said bottom plate including said bottom conveyor belt, said loader also comprising a vertically sliding device arranged at a rear end portion of said loader and adapted to be lowered after having engaged said horizontal pins in said bottom plate, wherein said vertically sliding device is driven by a pair of pneumatic pistons which are adapted to be vertically rectilinear reciprocated.

* * * * *